United States Patent Office 2,717,851
Patented Sept. 13, 1955

2,717,851

POLYCYCLIC INSECTICIDAL COMPOUNDS

Rex E. Lidov, Denver, Colo., assignor, by mesne assignments, to Shell Development Company, Emeryville, Calif., a corporation of Delaware No Drawing. Original application April 18, 1950, Serial No. 156,716, now Patent No. 2,676,132, dated April 20, 1954. Divided and this application December 13, 1952, Serial No. 325,881

9 Claims. (Cl. 167—30)

This application is a division of copending application Serial No. 156,716 filed April 18, 1950, now Patent No. 2,676,132.

This invention relates to new compositions of matter possessing unexpectedly high toxicity to insect life and particularly to insect life but little affected by the halogenated hydrocarbons and their derivatives hitherto employed.

The copending applications of Lidov, Serial No. 795,140 filed December 31, 1947, now Patent No. 2,635,979, and Serial No. 45,573 filed August 21, 1948, now Patent No. 2,635,977, relate to a group of polycyclic halogenated hydrocarbons and derivatives thereof which show not only unexpectedly high insecticidal activity but in addition a surprisingly high order of stability to reagents which normally readily degrade the previously known organic halogenated insect toxicants, and they also relate to the methods for producing these new compositions.

This invention relates, more specifically, to new members of the above described group of polycyclic halogenated hydrocarbons and their derivatives which possess in addition to the common properties of those compounds previously disclosed new properties in such marked degree as to render them particularly suitable and valuable in combatting pests but little affected by many or most of the family of compounds to which these members belong.

One object of this invention is to produce organic materials possessing a high order of insecticidal activity.

Another object of this invention is the production of a group of insecticidally active organic compounds which are stable, under ordinary conditions of use, to the usual degradative action of acids and alkalies.

Another object of this invention is the production of a group of stable, insecticidally active compounds with varying degrees of residual insecticidal activity.

Still another object of this invention is the production of organic materials possessing a high order of insecticidal activity with respect to insect species which, in general, are but poorly controlled by previously known halogenated organic insecticides.

A still further object of this invention is to provide means for the production of these new and valuable insect toxicants.

Other objects, features, capabilities and advantages are comprehended by the invention, as will later appear and as are inherently possessed thereby.

While, in recent years, a number of halogenated hydrocarbons or simple hydrocarbon derivatives have been discovered which possess, to a high degree, the property of toxicity to various forms of insect life these materials all possess limitations which to a lesser or greater extent reduce their utility and applicability. Thus, except for the compounds disclosed in the above cited copending applications all of the hitherto known organic halide insect toxicants have possessed the tendency to lose halogen and concomitantly their insecticidal activity.

Moreover, all of the previously discovered halogenated hydrocarbon toxicants, while extremely effective against many varieties of insect pests, are of limited or little use in combatting many other equally undesirable insect species. This fact is, in itself, not particularly surprising in view of the enormous number of insect species known and the large differences which can exist between species. It is therefore hardly surprising that no single insecticidal compound can be successfully used against all species.

Somewhat less understandable is the fact that certain large classes of noxious insects have possessed substantial immunity to all of the previously discovered halogenated insect toxicants, including those specifically disclosed in the copending applications hereinabove referred to.

I have now found that some classes of insects heretofore uncontrollable through the use of halogenated hydrocarbon toxicants are highly susceptible to the action of our new composition of matter. Since these classes of insects have, until now, been relatively resistant to compounds of this general type the fact that they are attacked by our new composition is both novel and unanticipated. This fact is even more surprising inasmuch as my new compounds are structurally quite similar to those disclosed in the copending applications hereinabove cited; they are actually stereoisomers of the compounds disclosed therein. Like the previously disclosed isomers my new compounds, while posessing a very high order of insecticidal activity, have their halogen atoms so firmly bound as to make them stable under conditions of alkalinity which cause the older halogenated insecticidal materials to lose halogen, and, simultaneously, to lose activity.

Significant, too, is my discovery that the product obtained when cyclopentadiene is caused to react with 1,2,3,4,7,7 - hexahalobicyclo - (2.2.1) - 2,5 - heptadiene in a Diels-Alder reaction is different from the product obtained when a similar reaction is carried out between hexahalocyclopentadiene and bicyclo-(2.2.1)-2,5-heptadiene.

My new compositions of matter are obtained directly by reacting one to four moles of a cyclopentadiene with 1,2,3,4,7,7 - hexahalobicyclo - (2.2.1) - 2,5 - heptadiene. The new compositions thus obtained possess the basic carbon skeleton of a series of not more than five linearly fused bicyclo-(2.2.1)-heptane rings, the fusion occurring through the two-carbon atom bridges of the bicyclic rings to produce a structure containing two terminal five-carbon atom rings, each of which is characterized by an ethylenic bond in its unfused two-carbon atom bridge. The basic carbon atom skeleton, in planar representation is, therefore, the one illustrated immediately hereinafter:

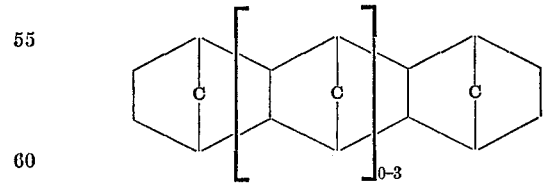

My new compositions are further characterized by the following unique structural features. Of the two terminal five-membered carbon rings one contains a double bond in the unfused two-carbon atom bridge and bears on its carbon atoms only halogen atoms which, in general, may be of one species only or may be comprised of atoms of more than one halogen species; the halogens thus present are preferably those with atomic numbers lying between 16 and 36, or a range embracing chlorine and bromine; the remaining terminal five-membered carbon atom ring contains at least one monovalent component attached to each of the two carbon atoms of the unfused two-carbon atom bridge.

While the foregoing description of my new compounds characterizes the second terminal five-carbon ring as containing at least one monovalent component attached to each of the two carbon atoms of the unfused two-carbon atom bridge, it may in fact have two such monovalent components attached to each of these two-carbon atoms. These two-carbon atoms may also be joined by a double bond instead of by a single bond only; in this case, of course, each of them would bear, additionally, only a single monovalent component.

The number of fused bicycloheptane rings present in the molecule will be determined by the number of moles of cyclopentadiene reacted with the halogenated polycyclic diene. When the two reactants are reacted in a mole to mole ratio the new molecule will contain only two fused bicycloheptane rings.

The cyclopentadiene chosen for the reaction can be either cyclopentadiene itself or a substituted cyclopentadiene such, for example, as methylcyclopentadiene, dimethylcyclopentadiene, etc. In this way, a variety of alkyl, cycloalkyl, arylalkyl and aryl substituents and derivatives thereof may be introduced into the unhalogenated ring or rings of my new compound. For ease of reference all such groups will hereinafter be called "alkyl" groups and the word "alkyl" will not be employed in its more restricted meaning without specifically noting that fact.

Halogen derivatives in which the halogen is attached to carbon atoms other than those of the unfused two-carbon atom bridge of the originally unhalogenated terminal five-carbon atom ring can be obtained by halogenating the primary compounds resulting from the Diels-Alder reaction. Subsequent to halogenation the application of the usual procedures for producing esters, alcohols and ethers from halo compounds will give rise to other of my new compounds.

Contemplated by and included within the scope of my present invention as hereinabove set forth are the compounds which are obtained by adding a variety of reagents to the ethylenic bond of the unhalogenated terminal five-carbon atom ring. Thus, for example, acetic acid can be added to the double bond of the unhalogenated ring in the presence of sulfuric acid to produce an acetoxy derivative of the parent compound. This acetoxy derivative can be hydrolyzed to produce an alcohol and the alcohol so obtained can be further oxidized to form a ketone. Similarly, halogens can be added to the aforementioned double bond to produce dihalo derivatives of the original compound, or alternatively, the halogen acids, HX, can be added to the double bond to produce monohalo derivatives of the original compound. In like fashion, hydrogen can be added to the same double bond to produce a dihydro derivative. It should be noted that in all such reactions the double bond in the halogenated terminal ring remains unchanged. All such derivatives of the originally formed Diels-Alder adduct and the additional compounds of like nature, which, as a result of my disclosure, skilled chemists will recognize can be prepared, are all properly included within the scope of my invention.

These compounds of my invention may also be represented by the following structural formula:

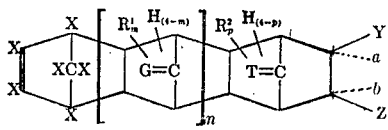

in which X represents a halogen atom, $n$ has an integral value from 0 to 3, both inclusive, and $m$ and $p$ each has an integral value from 0 to 4, both inclusive, Y and Z are preferably but not necessarily selected from the group of monovalent atoms and radicals consisting of

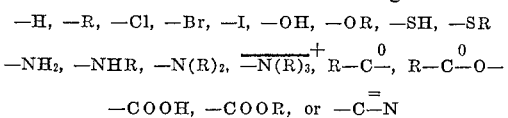

and "$a$" and "$b$" are representative of bonds attached to monovalent atoms and radicals selected from the above defined group or to each other. When "$a$" and "$b$" are attached to each other there will, of course, be introduced a second double bond into the polycyclic ring structure shown.

In the group of atoms and radicals set forth above, R represents a saturated hydrocarbon radical, an unsaturated hydrocarbon radical, a substituted derivative of a hydrocarbon radical, or a substituted derivative of an unsaturated hydrocarbon radical. $R^1$ and $R^2$ in the structural formula shown may represent one or more halogen atoms or one or more substituting radicals as defined above for R which may be attached to carbon atoms forming the indicated rings of the structure shown.

For the sake of simplicity the substituents in the pentacarbon cycles or rings, other than the completely halogenated terminal ring are represented by the symbol $R^1_m$ and $R^2_p$, where $m$ may range over an integral value from 0 to 4, both inclusive. More than one of these R type substituents may be present attached to the carbon atoms of the pentacarbon cycle, the number of groups so attached being defined by the integral values of $m$ and $p$. The values of $m$ and $p$ thus define the number of substituents in each cycle. Since, in these rings, each carbon atom must be attached either to a substituent, as previously defined, or to a hydrogen atom, the number of hydrogen atoms remaining attached to carbon atoms in each pentacarbon ring is given by the value of $(4-m)$. These R type groups may arise through the use of substituted cyclopentadienes in the preparation of the polycyclic dienophiles from which some of my new compositions of matter may be considered to be derived, as the result of halogenation reactions, or as a result of other reactions utilized to introduce such groups into the pentacarbon ring involved. They may also arise through the use of substituted cyclopentadienes in the reaction of such dienes with 1,2,3,4,7,7-hexahalobicyclo-(2.2.1)-2,5-heptadiene.

In the formula indicated the symbols G and T may also represent one or more substituents which are selected from the group consisting of H, halogen atoms, —R and =R. —R is here used in the same sense as hereinbefore defined; =R represents a saturated or unsaturated alkylidene or cycloalkylidene radical or a substituted derivative thereof. By an alkylidene radical, a radical of the general type

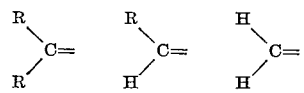

wherein R is used in its previously defined sense, is meant. A cycloalkylidene radical is one possessing the structure

$n$ having any desired integral value including and greater than one.

If alkylidene or cycloalkylidene radicals are represented by the symbols G or T, no other groups are attached to the endomethano carbon atoms. In any other case two of the other members of the indicated group, independently selected, will be attached to that carbon atom.

The alkylidene and cycloalkylidene type substituents may arise through the use of fulvenes in the preparation of the polycyclic dienophiles from which my new compositions of matter may be considered to be derived or through the use of fulvenes for reaction with the hexahalobicycloheptadienes. Other members of the group may arise in the same fashion as has been hereinabove described for R¹ and R².

Those skilled in the art will at once recognize that a selection of the monovalent atoms and radicals in the defined group for attachment to the bonds "a" and "b" and in place of Y and Z might so be made as to lead to compounds which are unstable. Such a situation would exist, for example, if the symbol Y is taken to represent a hydroxyl radical and the bond "a" is simultaneously attached to a hydroxyl radical. In such a case the compound represented would, in fact, be nonexistent since the configuration shown would lose the elements of water to form a ketone. It is my explicit intention that all of the stable compounds which are obtained as a result of the stabilization of the numerous compounds which can be represented by the above shown general structural formulae through the loss of $H_2O$, HOR, $H_2S$, SHR, $NH_3$, $NH_2R$, $NHR_2$ or hydrogen halide are to be included within the scope of my invention.

In other cases, it will be noted, the selection of appropriate members of the group will lead to compounds which by the usual procedures of organic chemistry might be expected readily to react with simple reagents with the loss of the elements of $H_2O$, HOR, SHR, $NH_2$, $NH_2R$, $NHR_2$ or hydrogen halide to produce new derivatives. This, for example, would be the case of "a" and "b" were each attached to a hydrogen atom and Y and Z were respectively attached to a halogen atom and to a hydroxyl radical. All of the derivatives of the structure shown which can be formally derived by loss of the elements of $H_2O$, HOR, $H_2S$, SHR, $NH_3$, $NH_2R$, $NHR_2$ or hydrogen halide therefrom are specifically included within the scope of my invention regardless of the procedures employed in their preparation.

Similarly, it is recognized that such selection of the monovalent atoms and groups will in some cases lead to representations of compounds which will, in general, be more stable, and hence will exist, in tautomeric modifications of the structures thus represented. This would be the case if, for example, Y is taken to represent a hydroxyl radical and the bonds "a" and "b" are joined to each other to form a new double bond. In this case the compound represented by the indicated structure will be a ketone. The stable compounds which result from all such tautomeric shifts are also explicitly intended as within the scope of my invention.

The reaction product which is obtained when one mole of 1,2,3,4,7,7-hexachlorobicyclo-(2.2.1)-2,5-heptadiene is reacted with one mole of cyclopentadiene, in accordance with the present invention, or when one mole of hexachlorocyclopentadiene is reacted with one mole of bicyclo-(2.2.1)-2,5-heptadiene as more particularly described and claimed in my copending application Serial No. 45,573 filed August 21, 1948, is represented by the planar structural formula which follows immediately hereafter.

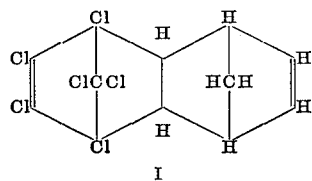

I

Yet each of the two compounds represented by a single graphical structure is physically and chemically distinct from the other. Hence, in order to illustrate and explain the differences between the compounds which may properly be represented by the planar structures hereinabove set forth, it will be necessary to discuss briefly the stereo chemical configurations of such compounds.

Given a simple bicycloheptene compound such as

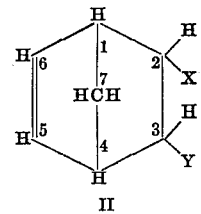

II it is believed that the four carbon atoms 2,3,5, and 6 may be considered to lie in the plane of the paper with the carbon atoms 1 and 4 above that plane and with the carbon atom 7 raised above that plane even further than atoms 1 and 4. The bonds joining the atoms H and X and H and Y to carbon atoms 2 and 3 are then thought to be disposed above and below the plane of the paper. The planar structure II consequently (disregarding optical isomerism) corresponds to three stereoisomers: these structures may be represented by three dimensional drawings, thus:

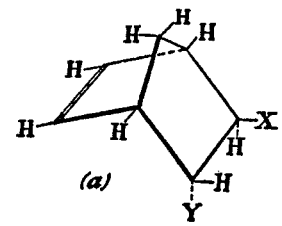
(a)

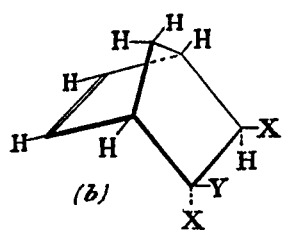
(b)

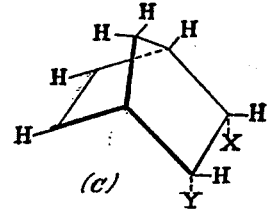
(c)

If both X and Y are taken to represent chlorine atoms, then, in accordance with the nomenclature most commonly employed, the compound (a) is a transdichloro compound, (b) is an exo-cis-dichloro compound and (c) is an endo-cis-dichloro compound.

It is further widely believed that when the attachments X and Y are parts of a ring system containing not more than six atoms the rings thus fused must assume either an exo-cis or an endo-cis configuration; presumably, a trans configuration is necessarily excluded.

If a compound such as I, above, is further examined, it follows that, four theoretically possible stereoisomers are represented:

(1) a compound in which the second 6 membered ring is fused in the exo-cis position and in which the endo-methano bridge in the second ring is oriented, in a general sense, in the same direction as the endo-methano bridge in the first 6 membered ring.

(2) a compound in which the second 6 membered ring is fused in the exo-cis position but in which the orientation of the second endo-methano bridge is directed in the opposite sense from that of the first.

These may be shown three dimensionally as:

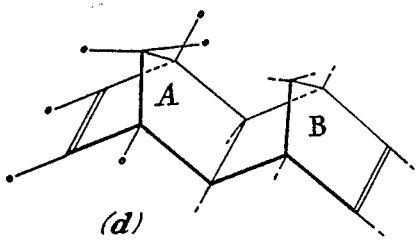

——○ =Cl
——· = H

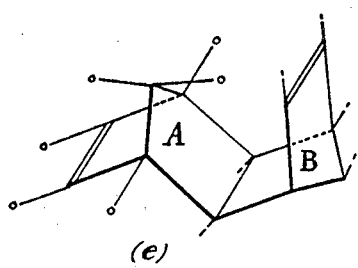

I shall henceforth speak of compound (d) as possessing an exo-exo configuration and further I shall refer to both ring A and ring B in that compound as possessing an exo configuration. I shall henceforth say that compound (e) possesses an exo-endo configuration and further I shall say that ring A in compound (e) possesses an exo configuration while ring B of compound (e) possesses an endo configuration.

The other two compounds represented by the planar structure I are the corresponding variants in which the second fused ring is in the endo-cis position. These may be shown as:

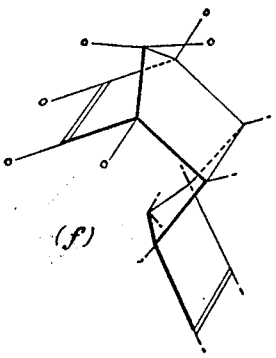

——○ =Cl
——· = H

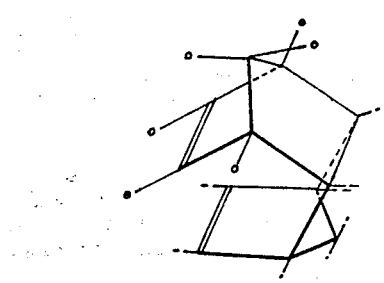

Henceforth I shall refer to compound (f) as possessing an endo-exo configuration and I shall further state that ring A in compound (f) possesses an endo configuration and that ring B in compound (f) possesses an exo configuration. Similarly I shall refer to compound (g) as possessing an endo-endo configuration and I shall further say that both rings of compound (g) possess an endo configuration.

I do not know with certainty which of the configurations shown should properly be assigned to my various compounds. It is my present belief that the compound formed when one mole of hexachlorocyclopentadiene reacts with one mole of bicyclo-(2.2.1)-2,5-heptadiene possesses either the exo-exo (d) configuration or the endo-exo (f) configuration. I shall henceforth call the configuration obtained in this fashion the "alpha configuration" and shall call the series of compounds so obtained the "alpha series." I further believe that the compound formed when cyclopentadiene reacts with 1,2,3,4,7,7-hexachlorobicyclo-(2.2.1)-2,5-heptadiene possesses either the endo-endo (g) configuration or the exo-endo (e) configuration. I shall henceforth call the configuration obtained by this second reaction method the "beta configuration" and shall call the series of compounds so obtained the "beta series." I believe further that if the first of these compounds (alpha) possesses the exo-exo configuration then the second of these compounds (beta) possesses the endo-endo configuration whereas if the alpha compounds possess the endo-exo configuration then the beta compounds possess the exo-endo configuration.

I believe that it is obvious that the discussion of configuration has not, to this point, considered the spatial relationships existing when the compound under consideration is one possessing more than two fused bicycloheptane rings. It follows, however, from what has already been said that such addition of one mole of a cyclopentadiene to a mole of any given fused polycyclic compound can lead to the formation of four stereoisomers. But since from my present knowledge of reactions of this type it appears that they tend to proceed to give stereochemically pure products the nature of which is determined primarily (although not necessarily exclusively) by the reactants, it follows that subsequent addition of cyclopentadienes to the tetracyclic primary products will actually lead to the formation of only one of the four theoretically possible additional configurations. From my present standpoint it is equally important to note that such additional reactions of cyclopentadienes with the four (alpha, beta, etc.) primary stereoisomers of hexahalotetracyclododecadiene will in each case involve substantially the same reaction, viz., the addition of a cyclopentadiene to the double bond of an unhalogenated bicycloheptane ring system; it therefore appears reasonable to assume that the stereo-chemical configuration around the added fusion points will be the same for each of the primary isomers.

From what has just been said it follows further that given four hexahalohexacyclododecadienes, formed by the addition of cyclopentadiene to the four hexahalotetracyclododecadienes, the essential configurational differences between them will be those which were originally present in the tetracyclododecadiene generators.

Accordingly, it would appear that in the multiple fused ring compounds which I herein disclose the configurational differences of importance are those which are present around the points of fusion of the hexahalogenated bicycloheptene ring system and the adjacent bicycloheptene ring system. I shall, therefore, henceforth refer to stereochemical configurations around this fusion line as the "basic stereo-chemical configuration" of my new compounds: it is this configuration with which I shall be primarily concerned and it is this configuration which will determine for me whether a compound is an alpha series compound, a beta series compound, etc.

It should be further noted that in addition to the various derivatives which can be prepared from my new compounds which have already been hereinabove discussed it is possible to convert my new beta halogenated polycyclic compounds to compositions possessing still another of the four possible configurations. I shall henceforth call this third configuration the "gamma configuration" and shall call the series of compounds possessing the gamma configuration the "gamma series." This will be more specifically illustrated in the examples which follow.

It should be clearly understood that, as already noted, the new compounds of my present invention include both the beta series of compounds derived as primary products directly from the Diels-Alder reaction of a cyclopentadiene with a hexahalocycloheptadiene and the compounds in the beta and gamma series obtained from the products denoted above as primary by reaction, with and without rearrangement, at the reactive double bond of those primary products. The nature of the rearrangement which may be involved in producing the gamma series will be more fully discussed hereinafter: a somewhat more detailed exposition of the relationship existing between the beta and gamma series will also be presented. However, let it here be noted that the term "allo-configuration" is defined as a generic term to denote the configuration of those compounds having either the beta or the gamma configuration; other configurations are explicitly excluded when the "allo" terminology is employed. As here employed, the prefix "allo," obviously borrowed from the field of steroid chemistry, is to be given only the significance hereinabove attached to it: it is not intended to connote the relationships for which it is used in the steroid field.

The diene syntheses can be accomplished most simply by sealing the generators into a suitable reaction vessel capable of withstanding pressures up to 300 pounds per square inch and heating the vessel and its contents to a temperature not exceeding 225° C. for a period of one to twenty hours.

The statement of reaction conditions hereinabove given is actually a recital of the most vigorous conditions which need be employed for the synthesis of the new compositions of matter which I have discovered. In the majority of cases, the reactions proceed rapidly and well at temperatures between 50°–150° C. and at pressures which are only slightly above atmospheric pressure. Actually, it is the vapor-pressure of the lowest boiling generator which determines the operating pressure, and when the boiling point of this generator lies above 80° C. the synthesis can usually be carried out at atmospheric pressure. Of course, if the polycyclic reactant boils in the temperature range in which the reaction is being conducted provision must be made for its reflux.

These novel halogenated hydrocarbons and hydrocarbon derivatives of my invention can also be prepared in the presence of suitable solvents. In general, reactions in solution require a longer period of time than reactions carried out in the absence of solvent. There is some advantage, however, which results from the fact that the reaction and the reaction temperature can be somewhat more easily controlled when a solvent is used.

A wide variety of solvents can be employed in carrying out these preparations. The rate of reaction will be highest if the solvent chosen has a boiling point above 80° C. For this purpose, chlorobenzene, xylene, dibutyl ether, etc., can advantageously be chosen. If desired, however, materials such as benzene, toluene, butyl alcohol, dioxane, etc. can also be used, at the expense, of course, of reaction time.

The examples which follow will serve to illustrate more completely and explicitly the methods and procedures which may be employed to prepare the new compositions of matter which I have invented. It is, of course, to be understood that these examples are illustrative only and that they are not to be taken as limiting the scope of my invention.

Examples I, II and III which follow show how the one to one adduct of cyclopentadiene with 1,2,3,4,7,7-hexachlorobicyclo-(2.2.1)-2,5-heptadiene can be prepared. Examples I and II illustrate the preparation of the necessary polychlorobicyclic diene, as more particularly described and claimed in the copending application of Bluestone, Serial No. 327,458 filed December 22, 1952, and Example III indicates how that diene may be reacted with cyclopentadiene in accordance with the present invention.

EXAMPLE I

A 3 liter flask equipped with a sparger and a thermometer was charged with 2,550 grams of hexachlorocyclopentadiene having a purity of approximately 90%. Gaseous vinyl chloride in the reaction vessel was maintained at 2 atmospheres (absolute pressure) and the temperature of the reacting liquid was maintained at 120±2° C. The reaction was discontinued after 48 hours, and the reaction solution was fractionated to separate unchanged hexachlorocyclopentadiene and the product. At a distillation pressure of 20 mm. Hg abs. the fraction distilling at 122–130° C. was separated; this material was unchanged hexachlorocyclopentadiene. A second fraction, which solidified in the receiver, boiling between 130–150° C. was also collected. This fraction was melted and transferred to a beaker, cooled and brought on a suction filter in order to separate additional hexachlorocyclopentadiene. The residue on the filter was dissolved in methanol, and treated with decolorizing charcoal at the boiling point of the solution; the methanol was completely evaporated from the solution and the crystals which resulted were air dried. In this way 694.5 grams of a product melting between 125–136° C. was recovered.

*Analysis.*—Calculated for $C_7H_3Cl_7$: Carbon, 25.07%, hydrogen, .86%, chlorine, 74.1%. Found: Carbon 25.5%, hydrogen, .86%, chlorine, 74.1, 74.4%.

The compound thus obtained is the adduct of hexachlorocyclopentadiene with vinyl chloride, 1,2,3,4,5,7,7-heptachlorobicyclo-(2.2.1)-2-heptene, presumably correctly represented by the planar structural formula:

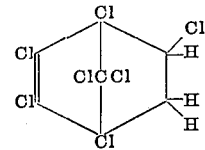

EXAMPLE II

Heptachlorobicycloheptene (product of Example I) was treated with ethanolic potassium hydroxide solution at the reflux temperature of ethanol for approximately 4 hours; the solution contained 3 moles of potassium hydroxide for each mole of the chloro compound present therein and its concentration with respect to potassium hydroxide was approximately 3 molar. The reaction mixture became very dark and inorganic salts were thrown out of solution. These salts were separated on a filter and most of the ethanol was removed, by evaporation, from the remaining solution. The concentrated solution which resulted was stirred into water and the mixture was acidified with hydrochloric acid. Most of the water was decanted from the resulting two phase mixture and the residue was extracted with diethyl ether. This step in the process resulted in the formation of an emulsion which separated only slowly. The separated ether phase was dried over anhydrous sodium sulfate and the ether was evaporated leaving a black oily material. This black oily material was distilled in vacuo and the cut boiling between 128–145° C. at 18 mm. Hg abs. was collected. The material in fraction represented a yield of approximately 78% based on the amount of heptachlorobicycloheptene taken for reaction.

*Analysis.*—Calculated for C₇H₂Cl₆: Carbon, 28.1%, hydrogen, 0.67%. Found: Carbon, 28.5%, hydrogen, 0.81%.

The compound thus obtained is 1,2,3,4,7,7-hexachlorobicyclo - (2.2.1) - 2,5 - heptadiene presumably correctly represented by the planar structural formula:

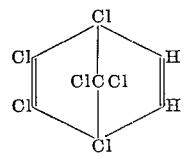

EXAMPLE III

Into a 500 ml. 3-neck round bottom flask equipped with a stirrer, thermometer and reflux condenser was placed 299 grams (1 mole) of the hexachlorobicycloheptadiene of Example II. While stirring very slowly 46 grams (0.7 mole) of freshly distilled cyclopentadiene was added to the chloro compound. The reaction mixture was warmed to 65° C. and the lower half of the flask was insulated to retard heat loss. The temperature rose slowly to 98° C.; the temperature was then maintained in the vicinity of 100° C. by regulation of the stirring rate. When the reaction ceased to liberate heat and the temperature dropped to 50° C. another 33 grams (0.5 mole) of cyclopentadiene was added to the reaction mixture and the solution was then heated and maintained between 75–90° C. for 2 hours. At the end of that time the mixture was cooled and when the temperature reached 60° C. solid material began to separate. The mixture was rewarmed to 70° C. and poured into a boiling acetone-methanol mixture. When the solution thus obtained cooled a white crystalline solid separated. This was separated on a filter and dried; it weighed 210 grams and melted between 240–242° C. Additional crystalline material substantially identical with that first obtained was recovered by concentration of the mother liquor.

*Analysis.*—Calculated for C₁₂H₈Cl₆: Carbon, 39.49%, hydrogen, 2.21%, chlorine, 58.30%. Found: Carbon, 39.6%, hydrogen, 2.16%, chlorine, 58.1%.

The compound thus obtained is beta-hexachlorotetracyclododecadiene (beta - 1,2,3,4,10,10 - hexachloro-1,4,4a,5,8,8a - hexahydro - 1,4,5,8 - dimethanonaphthalene), presumably correctly represented by the planar structural formula:

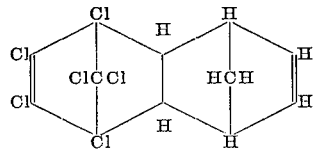

The next three examples, Examples IV, V and VI, demonstrate first, the method which may be used for adding reagents such as organic acids, alcohols, etc., to the double bond in the unhalogenated terminal 5-carbon atom ring of beta-hexachlorotetracyclododecadiene and further how the primary product, thus obtained, can be subsequently transformed to other new and useful compounds. Example IV illustrates the addition of acetic acid to the aforementioned compound to produce an acetoxy hexachlorododecene; Example V demonstrates the hydrolysis of this new compound to the corresponding alcohol and Example VI shows how the alcohol may be oxidized to form the corresponding ketone.

EXAMPLE IV

A solution containing 50 grams of beta-hexachlorotetracyclododecadiene and 20 ml. of concentrated sulfuric acid dissolved in 180 ml. of glacial acetic acid was refluxed for 20 minutes. The reaction mixture was poured into a large volume of water and the resulting two phase mixture was neutralized with sodium bicarbonate; the organic material was recovered from the resulting mixture by extraction with carbon tetrachloride. The carbon tetrachloride solution was placed on a steam bath and evaporated to dryness; the solid organic residue thus recovered was recrystallized from ethanol. There were thus obtained 50.4 grams of crystals which were once more crystallized from ethanol. The purified product thus obtained melted between 204–208° C.

*Analysis.*—Calculated for C₁₄H₁₂Cl₆O₂: Carbon, 39.56%, hydrogen, 2.79%, chlorine, 50.06%. Found: Carbon, 39.6%, hydrogen, 2.89%, chlorine, 50.2%.

The material thus obtained is the acetoxy hexachlorotetracyclododecene (5-acetoxy-1,2,3,4,10,10-hexachloro-1,4,4a,5,6,7,8,8a - octahydro - 1,4,5,8 - dimethanonaphthalene) presumably correctly represented by the planar structural formula:

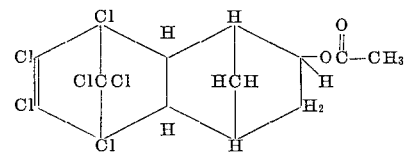

EXAMPLE V

Acetoxy-hexachlorotetracyclododecene (the compound of Example IV) was converted to the corresponding hydroxy compound by a trans-esterification procedure. The acetoxy compound was placed in solution in anhydrous methanol containing approximately 7% of hydrochloric acid by weight and the solution thus obtained was refluxed for approximately 42 hours; the refluxing was carried out in a flask fitted with a fairly efficient fractionating column and a solution enriched with respect to methyl acetate was removed at the top of the column. At the end of the refluxing period hydrochloric acid and any remaining methyl acetate was removed by distillation and from the resulting alcoholic solution a white crystalline solid was separated. This material melted with decomposition at 205° C.

*Analysis.*—Calculated for C₁₂H₉Cl₆OH: Carbon, 37.64%, hydrogen, 2.63%, chlorine, 55.55%. Found: Carbon, 37.7%, hydrogen, 2.75%, chlorine, 56.1%.

The material thus obtained is hexachlorohydroxytetracyclododecene (1,2,3,4,10,10-hexachloro-6-hydroxy-1,4,4a,5,6,7,8,8a - octahydro - 1,4,5,8 - dimethanonaphthalene) presumably correctly represented by the planar structural formula:

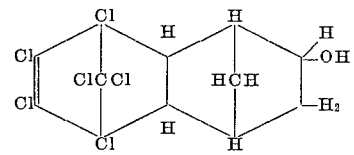

EXAMPLE VI

Hexachlorohydroxytetracyclododecene (3.8 grams) was dissolved in 100 ml. of glacial acetic acid and to the solution thus obtained there was gradually added an aqueous solution of potassium permanganate (2.5 grams in 100 ml. of water). The solution was maintained at 60° C. during the addition of the oxidizing agent and the temperature of the solution was then slowly raised to approximately 100° (steam bath). The temperature of the mixture was then permitted to drop to about 75° C. where it was maintained for approximately 3 hours. At the end of this time, the solid which had precipitated and which contained a mixture of manganese dioxide and the oxidation product, was separated on a filter. The organic material was recovered from the mixture with manganese dioxide by extraction with acetone. Evaporation of the acetone from the solution thus obtained led to the recovery of a crude oxidation product which was recrystallized from a mixture of acetone and hexane. There was thus isolated a pure crystalline material melting, with decomposition, at 290–291° C.

*Analysis.*—Calculated for $C_{12}H_8Cl_6O$: Carbon, 37.83%, hydrogen, 2.12%, chlorine, 55.85%. Found: Carbon, 38.0%, hydrogen, 2.15%, chlorine, 55.8%.

The material thus obtained is ketohexachlorotetracyclododecene (1,2,3,4,10,10 - hexachloro - 6 - keto - 1,4,4a,5,6,7,8,8a - octahydro - 1,4,5,8 - dimethanonaphthalene) presumably correctly represented by the following planar structural formula:

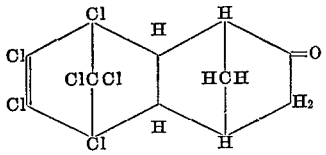

Hydrogen can be added to my new diene to form the corresponding dihydro compound. The preparation of beta-hexachlorotetracyclododecene is illustrated in Example VII.

EXAMPLE VII

A solution containing 18.3 grams of beta-hexachlorotetracyclododecadiene (0.05 mole) dissolved in 200 ml. of hexane was placed in a Parr low pressure hydrogenator. A teaspoonful of Raney nickel catalyst was added to the solution and hydrogenation of the mixture was carried out in the usual fashion. Pressure in the hydrogenator dropped approximately 4 pounds in one half hour and then became static. The solution was removed from the hydrogenator and passed through a filter to free it of the Raney nickel. Evaporation of the solvent caused the precipitation of a white crystalline solid. This solid melted between 218–219° C. The recovery of product was quantitative. In contrast to the starting material the product gave a completely negative test for unsaturation.

*Analysis.*—Calculated for $C_{12}H_{10}Cl_6$: Carbon, 39.28%, hydrogen, 2.75%. Found: Carbon 39.4%, hydrogen, 2.70%.

The product thus obtained is hexachlorotetracyclododecene (1,2,3,4,10,10 - hexachloro - 1,4,4a,5,6,7,8,8a-octahydro-1,4,5,8-dimethanonaphthalene) presumably correctly represented by the following planar structural formula:

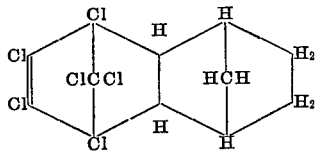

Examples VIII and IX show how halogen derivatives of beta-hexachlorotetracyclododecadiene may be obtained. Example VIII illustrates the preparation of the dichloro derivative of the starting material. Example IX details the preparation of bromohexachlorotetracyclododecene.

EXAMPLE VIII

A solution containing 20 grams of beta-hexachlorotetracyclododecadiene dissolved in 100 ml of carbon tetrachloride was chilled in an ice bath and treated with gaseous chlorine for a period of about 8 minutes. After about 5 minutes the reaction mixture had acquired a distinct yellow color. From the resulting solution a gummy residue was obtained by complete evaporation of the carbon tetrachloride. This residue was taken up in hot methanol; the methanol solution on cooling deposited a white crystalline solid. This solid melted at 212–213° C.

*Analysis.*—Calculated for $C_{12}H_8Cl_8$: Chlorine, 65.13%. Found: Chlorine, 65.25%.

The solid thus obtained is octochlorotetracyclododecene presumably correctly represented by the following planar structural formula:

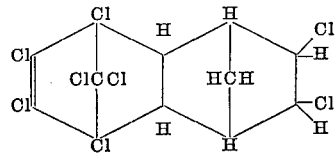

EXAMPLE IX

Beta-hexachlorotetracyclododecadiene (0.1 mole) was dissolved in 300 ml. of diethyl ether which had been dried for 18 hours over calcium chloride. The solution was held at 20° C. and anhydrous hydrogen bromide was passed into it for a 2 hour period. Concentration of the diethyl ether solution caused the precipitation of a high melting crystalline solid. Continued evaporation of the diethyl ether mother liquor resulted in the precipitation of a second crop of crystals which, crude, melted over the range of 100–145° C. Recrystallization of this material from a mixture of acetone and hexane produced a white crystalline solid melting sharply at 110–111° C.

*Analysis.*—Calculated for $C_{12}H_9Cl_6Br$: Carbon, 32.32%, hydrogen, 2.03%, halogen calculated as chlorine, 55,67%. Found: Carbon, 32.5%, hydrogen, 2.06%, halogen calculated as chlorine, 55.5%.

This material is therefore a bromo-hexachlorotetracyclododecene (6-bromo-1,2,3,4,10,10 - hexachloro - 1,4,4a,5,6,7,8,8a-octahydro-1,4,5,8 - dimethanonaphthalene) presumably correctly represented by the following structural formula:

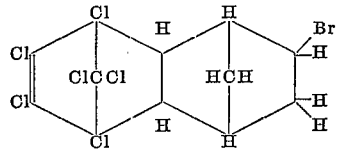

The fact that reactions occurring at the double bond in the unhalogenated ring of hexachlorotetracyclododecadiene (such as are illustrated in Examples IV and IX) can give rise to the derivatives of the gamma series of stereoisomers is particularly noteworthy. (It should be observed that while Example IV has been written to illustrate the separation of a single acetoxy derivative the reaction procedure there given leads to the formation of two acetoxy derivatives each of which can be isolated in pure form by appropriate separation methods. Only one method of separation is illustrated. It is believed that one of the acetoxy derivatives thus obtained is a beta series derivative and that the other is a gamma series derivative.) It is generally believed that when a reaction occurs at the double bond of a bicycloheptene compound which results in the formation of a "carbonium ion" as an intermediate, the ring system will rearrange; as a result, groups attached to the ethano bridge in the endo position will be found in an exo position in the new compounds formed in the reaction. This statement presupposes that if each of the carbon atoms of the ethano bridge bears a substituent, both of the substituents involved were originally in an endo position. Reasoning from this general assumption and the fact that a rearrangement occurs it may be inferred that the unhalogenated bicycloheptene ring in my new beta-hexachlorotetracyclododecadiene possesses an endo configuration and that the corresponding ring in the gamma compound possesses an exo configuration. It is my present belief that the halogenated ring in the beta compound possesses the same configuration as the halogenated ring in the gamma compound and further that the halogenated ring of the alpha series of compounds is different in its configuration from that of the corresponding rings in the beta and gamma series of compounds.

I am unable, at the present time, to say with certainty whether the acetoxy derivative of Example IV and the corresponding hydroxy and keto derivatives of Examples V and VI should be assigned beta or gamma configurations. I am similarly uncertain with respect to the bromo derivative of Example IX; in the latter case, however, we are inclined to believe that it possesses a beta configuration.

The specific illustrative examples hereinbefore given do not, of course, include all of the new compounds in the beta and gamma series which can be obtained by procedures already known to the art or herein disclosed. Thus, to indicate briefly other reactions which can be utilized for this purpose the following reaction paths can be cited. Obviously, such a recitation is again only intended to serve as a general guide and is not intended to be complete.

a. Hexabromocyclopentadiene may be caused to react by means of the diene synthesis reaction with vinyl chloride and the product thus obtained may be dehydrochlorinated to 1,2,3,4,7,7 - hexabromobicyclo-(2.2.1)-heptadiene. This diene may be reacted with cyclopentadiene to give beta-hexabromotetracyclododecadiene.

b. beta - hexabromotetracyclododecadiene may be caused to undergo the reactions hereinbefore illustrated.

c. Beta - hexachlorotetracyclododecadiene can be brominated to form a dibromohexachlorotetracyclododecene (beta or gamma).

d. Methyl cyclopentadiene (1-, 2- or 5-methylcyclopentadiene) may be caused to react mole for mole with 1,2,3,4,7,7-hexachlorobicyclo - (2.2.1) - 2,5-heptadiene to form a beta-methyl hexachlorotetracyclododecadiene, (i. e. the corresponding 5-, 6-, and 9-methyl-1,2,3,4,10,10-hexachloro-1,4,4a,5,8,8a-hexahydro - 1,4,5,8 - dimethanonaphthalenes).

e. Beta - hexachlorotetracyclododecadiene may be caused to react with cyclopentadiene to form beta-hexachlorohexacyclododecadiene, or with methyl cyclopentadiene to form the corresponding methyl derivative of the hexacyclododecadiene.

f. Beta - hexachlorotetracyclododecadiene - dichloride (Example VIII) can be dehydrochlorinated to form beta or gamma heptachlorotetracyclododecadiene.

g. Gamma-hexachlorotetracyclododecadiene can be obtained by the dehydration of gamma-6-hydroxy-hexachlorotetracyclododecene.

Many similar reactions useful for preparing the new compositions of my invention might be listed. Since, however, such a listing is intended only as an aid for the skilled chemist desiring to utilize my invention it is believed that no useful purpose can be gained by further extending the list of reactions already set forth.

While, for the sake of clarity, I have discussed the stereochemistry of my new compounds in some detail in an effort to elucidate the structures of these materials, it should, of course, be understood that my invention is not to be limited by the correctness of the views herein set forth with respect to reaction mechanisms, stereochemical configurations or structural theory.

These new products of my invention possess, as has already been noted, great practical usefulness as insect toxicants. As has already been noted, they are completely stable to alkali both in aqueous and non-aqueous solutions. Moreover, my new compounds exhibit a high degree of toxicity to a wide variety of insects. This is more specifically illustrated hereinafter.

Table II shows the toxicity of my new compounds to the common housefly (Musca domestica) in terms of the new halogenated insecticide chlordane, which for this purpose, is rated at 100%. The figures which are shown were obtained using the Kearns' modified small chamber method of test (Soap and Sanitary Chemicals, May, 1948, page 133) and the figures in Table II represent the relationship between the weight of chlordane required to produce an $LD_{50}$ and the weight of compound under test required to produce this same mortality.

The significance of these tests may be more readily appreciated after reference to Table I which shows the ratings of the commonly used organic halogenated insecticides when compared, in tests similar to those described above, with heptachlor.

Table I

| Compound | Relative Toxicity, Percent |
| --- | --- |
| Heptachlor | 100 |
| gamma isomer, Hexachlorocyclohexane | 100 |
| chlordane | 40 |
| DDT | 10 |

Table II

| Compound | Relative Toxicity, Percent |
| --- | --- |
| chlordane (standard) | 100 |
| beta-hexachlorotetracyclododecadiene (Ex. III) | 275 |
| beta-6-ketohexachlorotetracyclododecene (Ex. VI) | 32.5 |
| beta-6-bromohexachlorotetracyclododecene (Ex. IX) | 65 |

Tests of the insecticidal potency of my new compounds using insects other than flies attest the generality of their high insect toxicity.

Thus, for example, my new compound beta-hexachlorotetracyclododecadiene is the most potent material yet available against the roach. This is clearly shown by the data of Table III. As before, relative toxicities are indicated in comparison with chlordane which is arbitrarily assigned a value of 100%.

Table III

| Compound | Relative Toxicity, Percent |
| --- | --- |
| chlordane (standard) | 100 |
| Hepta-chlor | 350 |
| alpha-hexachlorotetracyclododecadiene | 350 |
| beta-hexachlorotetracyclododecadiene | 545 |

The similarly outstanding effectiveness of my new beta-hexachlorotetracyclododecadienes as toxicants for the true "bugs" is indicated by tests using the milkweed bug as the test insect. This insect is employed in evaluation tests as the representative of its class. The data obtained are listed in Table IV. As before, chlordane is arbitrarily assigned a value of 100%.

Table IV

| Compound | Relative Toxicity, Percent |
| --- | --- |
| chlordane (standard) | 100 |
| alpha-Hexachlorotetracyclododecadiene | 1,690 |
| beta-Hexachlorotetracyclododecadiene | 2,580 |

However, the greatest utility of my new compounds lies in fields unexpectedly different from those in which the earlier known members of the group are most effective. Thus, while certain of the earlier known members of the group such, for example, as alpha-hexachlorotetracyclododecadiene possess activity against the Mexican bean beetle this activity is much lower than the activity of the corresponding members of the beta series. I have now found that the corresponding beta compounds are extremely active against this common insect pest. The data indicate that, in general, the beta series of compounds shows higher toxicity to this insect than do the corresponding compounds of the alpha series. Since this particular insect tends to exhibit resistance to the halogenated hydrocarbon toxicants normally used to control many other undesirable species such activity on the part of my new compounds is particularly surprising.

The resistance of the various aphis species to the action of the halogenated insect toxicants is many times more marked than that of the Mexican bean beetle. In fact, at the present time, only three substances are effective against the many varieties of this pest, namely, tetraethylpyrophosphate or hexaethyltetraphosphate, parathion and nicotine.

These compounds, because of their high toxicity to mammals, the ease with which they can be absorbed in the body, and the great speed with which they act, are dangerous and must be handled with much caution. Moreover, as aphicides, none of them exerts a significant degree of residual activity.

I have now discovered that my new compound beta-hexachlorotetracyclododecadiene is extremely effective against the aphis species. Tests reveal that beta-hexachlorotetracyclododecadiene is three times as toxic to the aphis as is nicotine sulfate and that it is almost as toxic to that insect as is parathion.

Because of their physical form, their much lower degree of absorbability after external application to the mammalian body, and their much slower rate of toxic action toward mammals, my new compounds are far safter to employ than either parathion or the nicotine salts.

My new compositions of matter are soluble in all of the common organic solvents and they can be utilized as insect toxicants in all the ways customary in the art. Thus they can be dissolved in the insecticide base oils normally employed (as was done to obtain the data of Table II and Table III) and the resulting solutions sprayed or otherwise employed in the usual fashion. They can also be combined with finely divided carriers to produce wettable and non-wettable insecticidal dusts, they can be used in the presence of emulsifying agents, with water, and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of my new compounds make them particularly suitable in a number of less common but highly desirable applications for insecticidal materials. Thus, they can be added to paints, lacquers, varnishes, and polishing waxes which, after application, will give surfaces possessing a high order of insect toxicity. They can be added to paper products of all types either by suitable impregnation of the finished paper materials, or by incorporation during the manufacturing process. Similarly they can be added to tackifiers, plasticizers, printing inks, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packed in them from such attack. Because of their high resistance to the action of alkali, my new compositions can be incorporated into white-washes and other similar surface coatings. Those skilled in the art will, of course, recognize that many other similar uses for these unique compounds are possible, all of which follow from the special combination of valuable properties possessed by them.

It should be noted that my new composition beta-hexachlorotetracyclododecadiene appears to possess toxicity to the rat to an unusual degree. As a consequence of this fact it can be used to control this pest when short period toxicity is desired. These materials will be particularly valuable for rodent control in orchards where the field mouse and similar rodents present a serious problem; applied to the orchard floor or worked lightly into the topsoil they will serve not only to destroy the rodent pest but also to eliminate undesirable insect infestation found in and under the ground.

Moreover, many modifications of the basic concepts of my invention here presented will be evident to those skilled in the arts. Such modifications are properly to be included within the scope of my disclosed invention which is, in no way, to be restricted by the various illustrative data hereinbefore contained but only by the claims appended hereto.

I claim as my invention:

1. A compound of the group consisting of (1) 1,2,3,4,10,10 - hexachloro - 1,4,4a,5,8,8a - hexahydro - 1,4,5,8-dimethanonaphthalene having a melting point when pure of approximately 240° C., its (2) 6-acetoxy-6,7-dihydro, (3) 6-hydroxy-6,7-dihydro, (4) 6-keto-6,7-dihydro, (5) 6,7-dihydro, (6) 6,7-dichloro-6,7-dihydro, (7) 6-bromo-6,7-dihydro, (8) 6-chloro-6,7-dihydro, (9) 5-methyl, (10) 6-methyl, and (11) 9-methyl derivatives.

2. A compound having the structure:

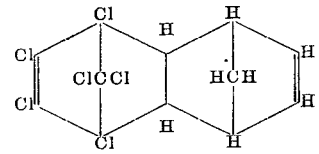

said compound when substantially pure and in crystalline form having a melting point of from about 240° to about 242° C.

3. A compound having the structure:

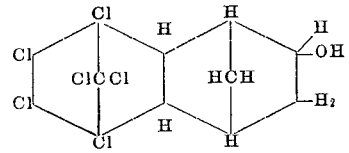

said compound when substantially pure and in crystalline form melting with decomposition at 205° C.

4. A compound having the structure:

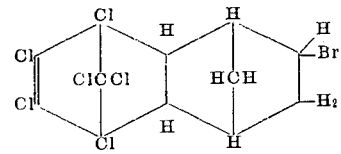

said compound when substantially pure and in crystalline form melting at 110°–111° C.

5. A compound having the structure:

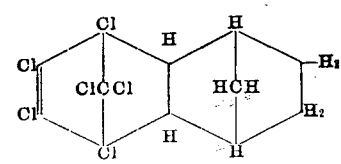

said compound when substantially pure and in crystalline form melting at 218°–219° C.

6. The method of forming a new composition of matter which comprises reacting cyclopentadiene with 1,2,3,4,7,7-hexachlorobicyclo-(2.2.1)-2,5-heptadiene by heating the reactants in the liquid phase.

7. As an insecticidal composition of matter 1,2,3,4,10,10-hexachloro-1,4,4a,5,8,8a-hexahydro-1,4,5,8-dimethanonaphthalene having a melting point when pure of approximately 240° C. disseminated in an insecticidal adjuvant as a carrier therefor.

8. The method which comprises applying to insects the compound 1,2,3,4,10,10-hexachloro-1,4,4a,5,8,8a-hexahydro-1,4,5,8-dimethanonaphthalene having a melting point when pure of approximately 240° C.

9. The method which comprises applying to insect habitats the compound 1,2,3,4,10,10-hexachloro-1,4,4a,5, 8, 8a-hexahydro-1,4,5,8-dimethanonaphthalene having a melting point when pure of approximately 240° C.

References Cited in the file of this patent

UNITED STATES PATENTS

| | | |
|---|---|---|
| 2,635,977 | Lidov | Apr. 21, 1953 |
| 2,635,979 | Lidov | Apr. 21, 1953 |